Patented Dec. 21, 1943

2,337,500

UNITED STATES PATENT OFFICE 2,337,500

PROCESS OF PREPARING AN ORGANIC BASE EXCHANGE MATERIAL

Joseph J. Savelli, Baytown, Tex., assignor to Standard Oil Development Company, a corporation of Delaware No Drawing. Application November 22, 1941, Serial No. 420,127

3 Claims. (Cl. 252—179)

The present invention relates to improvements in the preparation of a material adapted to exchange ions, particularly hydrogen ions, with other ionizable material such as calcium ions in dissolved $CaCO_3$. More specifically, my present invention relates to the preparation of carbonaceous materials adapted to remove ions from aqueous mediums containing the same, which carbonaceous material may be prepared from the acid sludges resulting from the refining of petroleum oil and which material is characterized by its capability of regeneration with an acid after its activity is impaired or destroyed.

Prior to my invention, others have prepared so-called carbonaceous "zeolites" or carbonaceous ion exchange materials by treating a variety of materials, including various materials of mineral or vegetable origin with rather concentrated acids, such as concentrated sulfuric acid, thereafter washing, drying, and screening the material to form a finished product. The materials described in prior patents and publications of the above-indicated character are primarily useful in softening water, for the reason that they remove the alkali and alkali earth metal ions and replace them with hydrogen ions, so that in the case where calcium carbonate were to be removed from water, the process would result in the formation of carbonic acid in the water, which carbonic acid could obviously be readily removed therefrom, as by heating.

The main object of my present invention is to utilize acid sludges resulting from the treatment of hydrocarbon oils, during the refining thereof, with acids, such as sulfuric acid, in the preparation of carbonaceous material adapted to remove ions from aqueous liquid mediums. As is well known to those familiar with the refining of petroleum oil, lubricating oil distillates for example are commonly treated with sulfuric acid in order to improve the quality thereof. Briefly, one process involves dissolving the lubricating oil distillate in liquefied propane, then deasphalting and dewaxing the said fraction according to known methods, and thereafter treating the fraction with sulfuric acid; the purpose of the sulfuric acid being to improve the quality of the oil. The acid treatment of lubricating oil fractions results in the production of a viscous black sludge. This material forms one source of sludge from which I may produce my carbonaceous ion exchange material.

In another refining operation, resulting in the production of an acid sludge, a crude residuum is dissolved in propane, is then deasphalted and dewaxed, and then treated with sulfuric acid in order to produce a so-called bright stock. This process also results in the formation of an acid sludge which is suitable for use in the production of my carbonaceous ion exchange material.

There are numerous other examples where refinery operations result in the production of a suitable acid sludge, as, for example, in the treating of mineral oil fractions to produce white oils and medicinal oils, in the acid treating of cracked naphthas, and others.

I shall now set forth several examples illustrating my invention, but it is to be distinctly understood that the following examples are purely illustrative and do not impose any limitation on my invention.

*Example 1.*—An acid sludge resulting from treating a reduced crude in liquefied propane was first fluxed with about 0.3 volume gas oil per volume of sludge (in order to decrease its viscosity) and about 0.3 volume of water per volume of sludge and was depropanized by heating and steaming. To one barrel of the fluxed sludge there was then added 0.75 bbl. of gas oil and 0.21 bbl. of water, and thereafter 0.14 bbl. of "Breaxit." This latter material is a water-soluble demulsifying agent prepared by heavily treating with concentrated sulfuric acid a lubricating oil distillate obtained from naphthenic base crude oil.

This mixture was agitated at a temperature of about 230° F. for a period of about ½ hour, and then the mixture was permitted to cool and settle. At the completion of the settling operation three layers were formed, as follows: An upper oil layer, an intermediate dark-colored layer, and an aqueous acid lower layer. The lower layer was withdrawn from the settling zone and discharged into a retort or tank, where the said aqueous acid was heated until its concentration was about 50% sulfuric acid. During the concentration of the acid in the last-named step, a black carbonaceous material separated from the acid. This latter material is a black, soft, semi-solid material having the approximate consistency of putty, which usually collects at the top of the aqueous acid solution and may be periodically removed by skimming. This carbonaceous material was removed and heated to 250° F., then washed with a light hydrocarbon oil fraction, such as a naphtha fraction, dried, and then heated at 500° F. for approximately two hours. The material was thereafter permitted to cool, thoroughly washed with water, dried, ground, and screened to a size of from about 10 to 20 mesh. This material constituted the finished product. Upon titration with standard alkali the finished material was found to possess an acidity corresponding to 10.3 wt.% of sulfuric acid.

*Example 2.*—The raw sludge resulting from the acid treatment of a lubricating oil fraction was heated at 350° F. for a period of about 1.5 hours and thereafter permitted to cool. The cooled material was then mixed with an equal weight of concentrated sulfuric acid and heated to a temperature of about 300° F. for a period of about 1 hour. The resulting carbonaceous material was then permitted to cool, washed with water, dried, crushed and screened to a size of 10 to 20 mesh to produce directly a carbonaceous ion exchange material.

*Example 3.*—In another example, I prepared in the following manner a carbonaceous ion exchanging material from the carbonaceous layer produced while concentrating the acid obtained by hydrolyzing sludge resulting from the acid treatment of a reduced crude in propane solution: A quantity of this carbonaceous layer was heated to 400° F. for a period of about 1.5 hours until the material formed a hard granular coke. The coke-like material was then washed with water, dried, screened to recover 10 to 20 mesh material and then heated to 250° F. for ½ hour. Thereafter, the material was heated with an equal volume of concentrated sulfuric acid at a temperature of 250° to 300° F. for 1 hour. The carbonaceous material resulting was washed with distilled water until the wash water from about 50 grams of material required less than 0.5 cc. of 0.1 normal NaOH to titrate. The material was again dried, crushed and screened and that portion having a size of from 10 to 20 mesh was recovered as a final product.

*Example 4.*—The raw sludge resulting from the 3 pound sulfuric acid treatment per barrel of a cracked naphtha was heated to a temperature of from 350° F. to 400° F. for about 1.5 hours, whereupon it became a hard mass upon cooling. It was then crushed, naphtha-washed, acetone washed, dried and treated with an equal volume of concentrated sulfuric acid at 300° F. for about 1 hour, cooled, washed with water and dried to produce directly a carbonaceous ion exchange material.

*Example 5.*—In order to show that the carbonaceous ion exchange material prepared according to Example 1 is adapted to successively undergo ionic exchange between a hydrogen ion thereof and a basic ion, which neutralized material may then be regenerated with acid, the following is submitted: 30 grams of the material having an acidity of 11.8% by wt. calculated as sulfuric acid was treated with 200 cc. of 0.916 normal sodium hydroxide. This mixture was mechanically stirred, the ion exchanging material was separated by decantation, washed, and, upon titration, was found to have an acidity of 9.2 wt.%, calculated as sulfuric acid. This slightly expended material was regenerated to an acidity of 10.8 wt.%, calculated as sulfuric acid, by mechanical agitation with 150 cc. of 50 wt.% sulfuric acid for 35 minutes, decantation, water washing, and drying. Twenty grams of this regenerated material was again treated by heating it to boiling with 90 cc. of 0.5 normal sodium hydroxide. The decanted, washed, and dried material had an acidity of 1.4 wt.%, calculated as sulfuric acid.

A second regeneration was carried out by mechanically agitating the spent material with 15 cc. of 50% by wt. sulfuric acid for one hour at atmospheric temperature. The water-washed and dried material from this operation had an acidity of 12.9 wt.%, calculated as sulfuric acid. It has thus been shown that the carbonaceous ion exchanging material prepared according to Example 1 may be readily regenerated at atmospheric temperatures by mechanically treating with sulfuric acid.

To recapitulate, my present invention relates to a new ion exchange material and the method of preparing the same particularly adapted to be employed to remove ions from water as in softening hard water. The source of my new ion exchange material is the various acid sludges resulting from treating petroleum oils with sulfuric acid.

Many modifications of my invention will suggest themselves to those familiar with this art. For instance, I may treat the sludge during carbonization with any mineral acid and I also regenerate the ion exchange material with such an acid but I prefer to use sulfuric acid.

What I claim is:

1. The process of preparing an acid reacting carbonaceous material adapted to exchange ions in an aqueous or oily medium which comprises heating with water the sludge resulting from the acid treatment of a mineral lubricating oil in order to cause hydrolysis and to form a relatively weak acid aqueous medium, withdrawing the acid aqueous medium from the heating zone, concentrating the acid by further heating in a separate zone to form a concentrated acid and a soft solid carbonaceous dark colored material, removing the dark colored material from the acid concentrating zone, and heating the said material at a sufficiently elevated temperature for a sufficient period of time to convert it into a hard granular coke, cooling, washing, and drying the coke.

2. The process of preparing a carbonaceous material adapted to exchange ions in an aqueous or oily medium which comprises heating the sludge resulting from the acid treatment of a mineral lubricating oil with water in order to cause hydrolysis and to form a relatively weak acid aqueous medium, withdrawing the acid aqueous medium from the heating zone, concentrating the acid by further heating in a separate zone to form a concentrated acid and a soft solid carbonaceous dark colored material, removing the dark colored material from the acid concentrating zone, and heating the said material at a sufficiently elevated temperature for a sufficient period of time to convert it into hard granular coke, cooling, washing, drying and screening the coke and then treating it with an equal weight or volume of concentrated sulfuric acid at elevated temperatures for an extended period of time, and cooling, washing, and drying the coke.

3. A method of producing an ion exchange material which comprises hydrolyzing the sludge resulting from the acid treatment of a mineral oil, separating a carbonaceous material resulting from the last-named step, heating the said carbonaceous material at such a temperature and for such a period that a hard coke results, washing and dry the said coke.

JOSEPH J. SAVELLI.